(12) United States Patent
Nemoto

(10) Patent No.: US 7,350,844 B2
(45) Date of Patent: Apr. 1, 2008

(54) STRUCTURE OF SEAT WITH WALK-IN MECHANISM

(75) Inventor: Akira Nemoto, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 90 days.

(21) Appl. No.: 11/413,049

(22) Filed: Apr. 28, 2006

(65) Prior Publication Data

US 2007/0257536 A1 Nov. 8, 2007

(51) Int. Cl.
*B60N 2/02* (2006.01)
(52) U.S. Cl. .................... 296/65.16; 296/65.15
(58) Field of Classification Search ............ 296/65.16, 296/65.15
See application file for complete search history.

(56) References Cited

U.S. PATENT DOCUMENTS

| | | | | |
|---|---|---|---|---|
| 4,143,911 A | * | 3/1979 | Sakakibara et al. | 296/65.14 |
| 4,955,678 A | * | 9/1990 | Kobayashi | 312/332.1 |
| 5,014,960 A | * | 5/1991 | Kimura | 248/602 |
| 5,217,195 A | * | 6/1993 | Tanaka et al. | 248/396 |
| 5,597,206 A | * | 1/1997 | Ainsworth et al. | 297/378.12 |
| 5,799,920 A | * | 9/1998 | Wittkowsky et al. | 248/429 |
| 5,800,015 A | * | 9/1998 | Tsuchiya et al. | 297/331 |
| 6,030,042 A | * | 2/2000 | Bauer et al. | 297/341 |
| 6,926,364 B2 | * | 8/2005 | Cooley et al. | 297/378.12 |

FOREIGN PATENT DOCUMENTS

JP 2004-122798 4/2004

* cited by examiner

*Primary Examiner*—Kiran B. Patel
(74) *Attorney, Agent, or Firm*—Browdy and Neimark, PLLC

(57) ABSTRACT

A walk-in mechanism is provided to a seat, which includes an extension coil spring. One end of the extension coil spring is engaged with a first support element fixed to a floor, while another end thereof is engaged with a second support element fixed to the seat. The walk-in mechanism further includes a connecting element for operatively connecting such another end of extension coil spring with a seat back of the seat. Forward and backward movement of the seat causes movement of both of the second support element and another end of extension coil in forward and backward directions. Also, with forward inclination of the seat back, such another end of extension coil spring is moved backwardly via the connecting element. Hence, a tensile force of the extension coil spring is increased and decreased to allow a user to easily move the seat to either of walk-in position and normal use position.

4 Claims, 2 Drawing Sheets

STRUCTURE OF SEAT WITH WALK-IN MECHANISM

BACKGROUND OF THE INVENTION

1. Field of the Invention

The present invention relates to a seat with a walk-in mechanism, which is so designed that the seat may be moved forwardly to a walk-in position where a passenger can smoothly get in a vehicle behind the seat in order to climb onto or descend from a rear seat or the like. More particularly, the invention is directed to a structure of such seat with walk-in mechanism wherein a biasing force of spring element is used to forcibly cause forward sliding movement of the seat to the walk-in position in conjunction with forward inclination of a seat back of the seat.

2. Description of Prior Art

Among seats with walk-in mechanism (the so-called "walk-in seat"), there has been known a seat with walk-in mechanism of the type using a spring element. Such walk-in seat is used as a front seat in most cases. For instance, according to a seat of this kind disclosed in the Japanese Laid-Open Patent Publication No. 2004-122798, a spring element is mounted in a seat slide device provided beneath a seat cushion of the seat, and, upon forward inclination of a seat back connected via a reclining device with the seat cushion, a lock mechanism is operated to unlock the reclining device and simultaneously the seat is slidingly moved along the slide device forwardly by a biasing force of the spring element.

In this walk-in mechanism, therefore, the seat is moved forwardly by the biasing force of spring element. That is, the spring element is required to have a biasing force enough to cause the sliding movement of the seat, considering a weight of the seat itself and a certain resistance in the slide rail device against the sliding movement of seat.

In particular, in the case where a backwardly slant support base member is provided between the seat and a floor of vehicle to incline both seat and seat slide device upwardly relative to the backward end portions of the seat and seat slide device, a considerably increased biasing force is required in the spring element in addition to the abovementioned factors.

Certainly, the use of such spring element with a highly increased biasing force is effective in causing forward sliding movement of the seat along the upwardly sloped support base member to a given walk-in position. But, in that case, a considerable force against such strong biasing force is required to a user who will move back the seat that has been moved to the walk-in position towards a normal use position. Hence, this improvement leaves a problem in terms of an undesired labor on the user's side, which will eventually result in a poor operationability of both walk-in mechanism and seat.

SUMMARY OF THE INVENTION

In view of the above-stated drawbacks, it is a purpose of the present invention to provide an improved structure of seat with walk-in mechanism which is simplified in structure and allows a user not only to easily move the seat to a walk-in position, but also to easily move back the seat from the walk-in position to a normal use position.

In order to achieve such purpose, a structure of seat with walk-in mechanism in accordance with the present invention is characterized in that:

the seat is movable in a forward direction to a side forwardly thereof and in a backward direction to a side backwardly thereof, the seat including: a seat cushion; and a seat back rotatably connected with the seat cushion so as to allow for forward inclination thereof in the forward and for backward inclination thereof is the backward directions, the walk-in mechanism includes a spring means and is operable in conjunction with the forward inclination and backward inclination of the seat back, such that, with the forward inclination of the seat back, the seat is biasingly caused by the spring means to move form a normal use position in the forward direction to a walk-in position which allows a passenger to enter a space behind the seat, wherein the walk-in mechanism comprises;

an extension coil spring element as the spring means, the extension coil spring having one end and another end;

a first support means fixed to a side of the floor of vehicle so as to be stationary relative to the floor of vehicle;

such one end of the extension coil spring being engaged with the first support means; and a second support means fixedly provided to a side of the seat, such that, with movement of the seat in the forward and backward directions, the second support means is moved relative to the floor of vehicle in the forward and backward directions, the second support means including a connecting means for operatively connecting the afore-said another end of the extension coil spring with the seat back, and wherein movement of the seat in the forward and backward directions causes simultaneous movement of both of the second support means and the afore-said another end of the extension coil in the forward and backward directions, and wherein, upon the seat back being inclined in the forward direction, that another end of the extension coil spring is moved in the backward direction via the connecting means.

Preferably, the connecting means may comprises: a wire cable having one end portion and another end portion; and a link element which is fixed to the seat back so as to be displaceable with the forward and backward inclination of the seat back. Such one end portion of the wire cable is engaged with the foregoing another end of extension coil spring, while that particular another end portion of wire cable is connected with the link element, such that the afore-said one end portion of wire cable is movable in the forward and backward directions in conjunction with the forward and backward inclination of seat back, to thereby increase and decrease a tensile force of the extension coil spring extended between the first support means and such one end portion of wire cable.

Preferably, a stopper means may be provided, which provides a limit point and prevents the foregoing one end portion of wire cable from being moved in excess of such limit point in the forward direction, so as to set the extension coil spring in a minimum active point where a tensile force of the extension coil spring is decreased to a minimum degree.

Other various features and advantages of the present invention will become apparent from reading of the description hereafter, with reference to the annexed drawings.

DETAILED DESCRIPTION OF PREFERRED EMBODIMENT OF THE INVENTION

Figure 1:
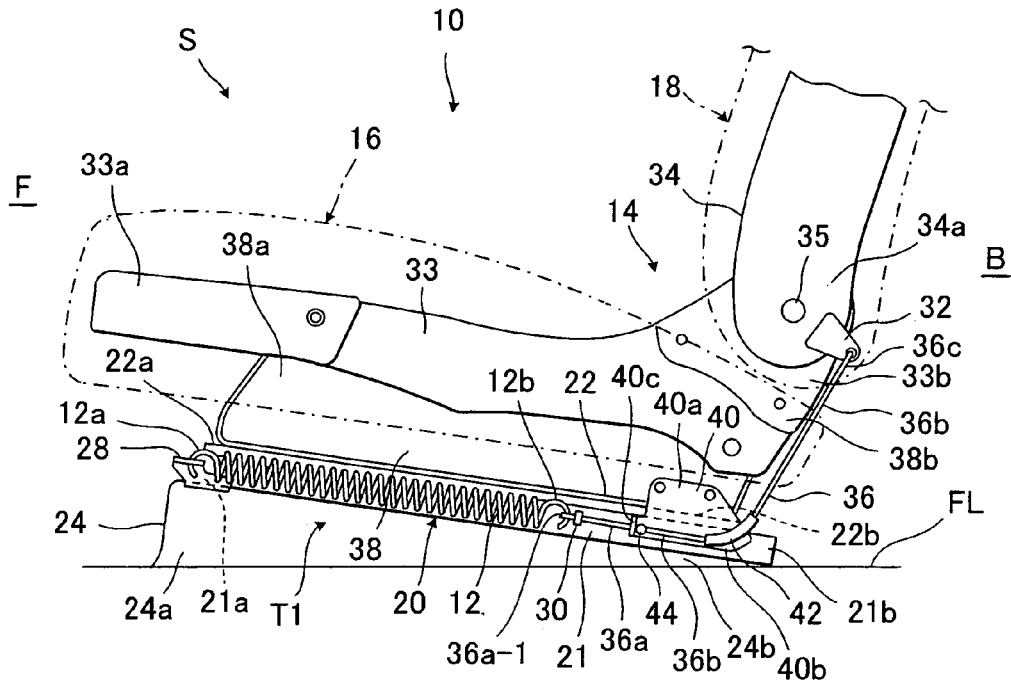
FIG. 1 is a partly broken side elevational view of a seat with walk-in mechanism in accordance with the present invention, which shows the state where the seat is set in a normal use position.

Referring to FIGS. 1 to 5, there is illustrated a preferred embodiment of a seat with walk-in mechanism, as generally designated by (S), in accordance with the present invention.

As shown, the seat (S) itself is basically formed by a framework comprising a seat cushion frame (33) and a seat back frame (34). Of course, as indicated by the one-dot chain lines, the seat cushion frame (33) is properly upholstered to form a seat cushion (16) and the seat back frame (34) is also properly upholstered to form a seat back (18), as known in the art.

Designation (10) represents a walk-in mechanism of the present invention, which will be elaborated later.

It is noted that the term, "forward" or "forwardly", refers to a side (F) forwardly of the seat (S), whereas the term, "backward" or "backwardly", refers to a side (B) backwardly of the seat (S).

The seat back frame (34) is connected at the lower end portion (34a) thereof with a backward end portion (33b) of the seat cushion frame (33) via a reclining device (not shown), so that the seat back frame (34) or seat back (18) is inclined about a shaft (35) forwardly and backwardly.

The seat cushion frame (33) is fixedly connected via a riser member (38) with a seat slide device (20). The riser member (38) is at the upper end thereof fixed to the seat cushion frame (33). The seat slide device (20) per se is known in the art, which typically comprises a stationary guide rail (21) and a movable rail (22) slidably engaged with the stationary guide rail (21). While not shown, a pair of such seat slide deices (20) are normally provided under the seat cushion (33).

The riser member (36) is further at the lower end thereof fixed to the movable rail (22) so that the seat cushion (16) is fixedly coupled via the riser member (36) to the movable rail (22), thereby allowing the seat (S) to be slidingly movable forwardly and backwardly by means of the seat slide device (20).

Designation (24) stands for a sloped support base on which the seat (S) is mounted via the seat slide device (20) in such a manner as to be upwardly inclined in a direction to the forward side (F), with a view to providing a more comfortable seating condition to a driver or passenger sitting on the seat (S). Namely, the stationary guide rail (21) of the seat slide device (20) is firmly fastened on the sloped support base (24) as shown, thus setting the seat (S) on that seat slide device (20) in an upwardly inclined state in a direction to the forward side (F). Hence, the seat (S) is slidingly movable along a sloped line in the forward and backward directions.

While not shown, as with the conventional seat with walk-in mechanism, a lock mechanism is provided between the movable rail (21) and stationary guide rail (22), and such lock mechanism is operatively coupled with the seat back (18) in an interlocked manner, such that forward inclination of the seat back (18) results in the lock mechanism being unlocked to thereby allow for fore-and-aft movement of the seat (S) along the guide rail (22). This is however not the subject matter of the present invention and further description thereon is omitted for the sake of simplicity. Also, as previously stated in the description of prior art, in the present invention, a spring element is used as a principal part of walk-in mechanism in this kind of seat, with such an arrangement that, upon forward inclination of seat back, the afore-stated lock mechanism in seat slide device is automatically unlocked to release the seat from a locked state, and, simultaneous therewith, a biasing force is created by the spring element, which tends to bias the seat in a forward direction, thereby assisting in forward sliding movement of the seat via the slide device.

Based on the foregoing known walk-in mechanism, in accordance with the present invention, generically stated, the walk-in mechanism (10) features an extension coil spring (12) as a novel mode of the afore-said spring element and also features a simplified arrangement of such extension coil spring (12) wherein one end (at 12a) of the spring (12) is engaged with a stationary support means (at 28) fixed to the side of floor (FL), while another end (at 12b) thereof is engaged with a movable support means (at 40) fixed to the side of seat (S), the movable support means being movable relative to the side of floor (FL) for assisting in forward and backward movement of the seat (S), and wherein such movable support means includes a connecting means for operatively connecting the afore-said another end (at 12b) of extension coil spring (12) with the seat back (18). Hence, such another end (at 12b) of extension coil spring (12) is movable in conjunction with forward and backward movement of the seat (S) as well as with forward and backward inclination of the seat back (18), to thereby increase and decrease the tensile force of the spring (12), and in particular, the tensile force of the spring (12) is reduced when the seat (S) is set in a walk-in position, as will be elaborated later.

Specifically, according to the illustrative mode of walk-in mechanism (10), a forward stationary support member (28) is provided as the foregoing stationary support means, and a movable support member (40) is provided as one constituent part of the foregoing movable support means. Extended between those two support members (28) and (40) are the extension coil spring (12) so as to extend abreast with and along the seat slide device (20), as will be described later.

As shown, the stationary support member (28) is fixed to the forward end portion (21a) of the stationary guide rail (21) which is fixedly connected via the sloped support base (24) to the floor (FL), whereas the movable support member (40) is fixed to the backward end portion (38b) of the riser member (38). Otherwise stated, the movable support member (40) is fixedly connected via the riser member (38) to the movable rail (22) of the seat slide device (20) which also forms a part of the aforementioned movable support means.

A forward hooked engagement end (12a) of the extension coil spring (12) is engaged in a through-hole (not shown) formed in the forward stationary support member (28), so that the extension coil spring (12) is retained stationary by that particular support member (28) at the forward end thereof.

The movable support member (40) is so formed to have: an upper securing portion (40a) fixed to the backward end portion (38b) of riser member (38); a lower extension portion (40b); and a support/stopper lug (40c) formed in that lower extension portion (40b). Lower extension portion (40b) extends continuously from the upper securing portion (40a) downwardly from the riser member (38) to a point on the same level with the stationary guide rail (21) of seat slide device (20). In other words, the lower extension portion (40b) extends abreast with and adjacent to the stationary guide rail (21). As shown, formed integrally with the foremost end of such lower extension portion (40b) is the support/stopper lug (40c) which has a through-hole formed therein, though not clearly shown.

The walk-in mechanism (10) further includes: a curved tubular guide member (42) and a connecting link (32), which forms a part of the afore-stated connecting means of the movable support means. Specifically, the connecting link (32) is shown as being fixed to the lower end portion (34a) of seat back frame (34) so as to project backwardly therefrom. On the other hand, the curved tubular guide member (42) is firmly attached to the backward end region of the lower extension portion (40b) of the movable support member (40), such that one end thereof faces to the support/stopper lug (40c), while another end thereof faces to the connecting link (32).

Further, according to the walk-in mechanism (10), a wire cable (36) is provided as the afore-said connecting means of movable support means and extended between the extension coil spring (12) and the connecting link (32) via the movable support member (40) and curved tubular guide member (42). More specifically, the wire cable (36) has a foremost engagement end (36a-1) (which may preferably be in a looped shape) in which is engaged a backward hooked engagement end (12b) of the extension spring (12), and the remaining portion of that extension coil spring (12) other than the foremost engagement end (36a-1) thereof extends backwardly abreast with and along the stationary guide rail (21), passing through the previously stated through-hole of the support/stopper lug (40c) and an inner through-bore of the curved tubular guide (42). That is, the wire cable (36) extends rectilinearly along the seat slide device (20) and is curved via the curved tubular guide member (42) in an upward direction toward the seat back (18). Hence, it is seen that the rearmost end (36c) of the thus-curved wire cable (36) is securely connected with the connecting link (32) disposed at the lower end region of the seat back (18), and that, in that particular wire cable (36), there is defined a generally horizontal lower wire cable region (36a) and a generally vertical wire cable region (36b) in relation to the curved tubular guide member (42).

Designations (30) and (44) denote a forward stopper piece and a backward stopper piece, respectively. The forward stopper piece (30) is fixedly provided to the foremost engagement end (36a-1) of wire cable (36). As will be explained, the stopper piece (30) serves to define a backward limit for limiting backward movement of the wire cable (36) as well as excessive backward stretch of the extension spring (12). On the other hand, the backward stopper piece (44) is fixedly attached to a predetermined point of the generally horizontal lower wire cable region (36a) of wire cable (36). As will be explained, this backward stopper piece (44) serves to define a forward limit for limiting forward movement of the wire cable (36) and also define a normally active point or a minimum active point to the extension spring (12), subject to the seat (S) being set in a normal use position (as in FIG. 1) or in a walk-in position (at WI). Preferably, such backward stopper piece (44) is a known spherical stopper piece having a diameter greater than a diameter of not-shown through-hole of the wire support lug (40c).

It is therefore appreciated that, by virtue of the above-arranged movable support member (40) and wire cable (36), with forward and backward movement of the seat (S) as well as we as with forward and backward inclination of the seat back (18), the backward hook-like engagement end (12b) of extension coil spring (12) is only movable forwardly and backwardly within a limited range defined between the forward and backward stopper pieces (30) (44) so as to increase and decrease the tensile force of the extension coil spring (12).

With the above-described arrangement, a detailed description will be made of operation of the seat (S) with the walk-in mechanism (10) hereinafter.

At first, as shown in FIG. 1, the seat (S) is set at a normal use position where it is locked by a not-shown locking mechanism of the seat slide device (20), which has been described earlier, and the seat back (18) thereof is set in an upright use position. Under that normal state, it is to be seen that the backward stopper piece (44) is biased by the extension coil spring (12) into contact with the support/stopper lug (40c), whereby the extension coil spring (12) is retained against further contraction, thereby being stretched to a normal degree, as indicated by (T1). Namely, the extension coil spring (12) is in a normally active state where it advantageously serves to resiliently stretch the wire cable (36) taut between the spring (12) and the connecting bracket (32), thereby insuring direct and quick transmission of operation force given by forward inclination of seat back (18) to the extension coil spring (12) via the wire cable (36).

Figure 2:
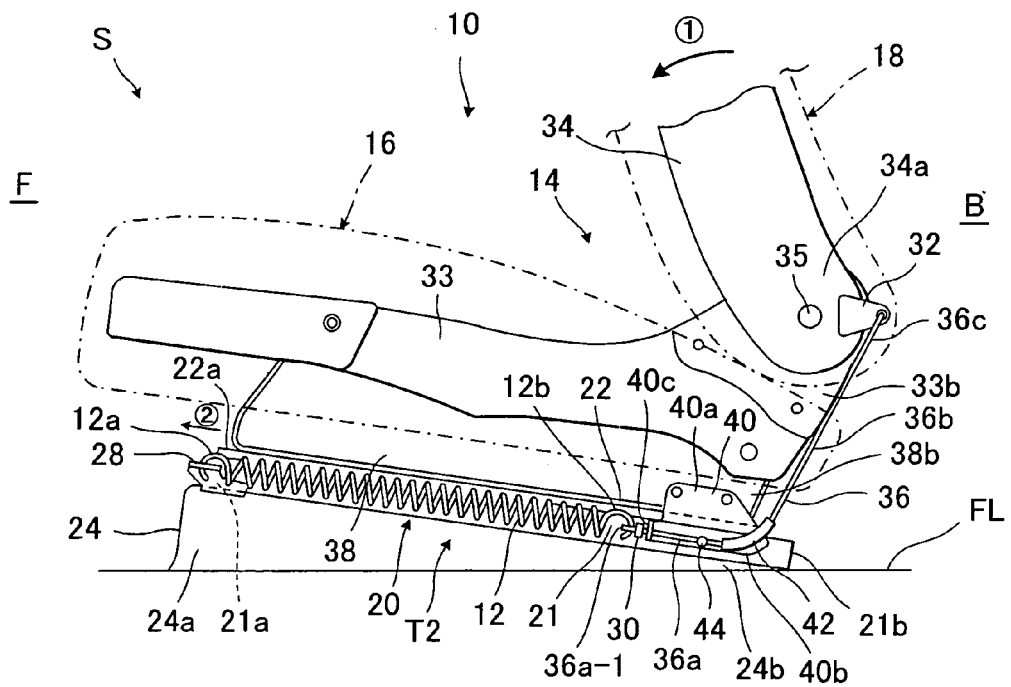
FIG. 2 is a partly broken side elevational view of the seat with walk-in mechanism, which shows the state where one end of an extension coil spring is moved backwardly with forward inclination of a seat back of the seat.
Figure 3:
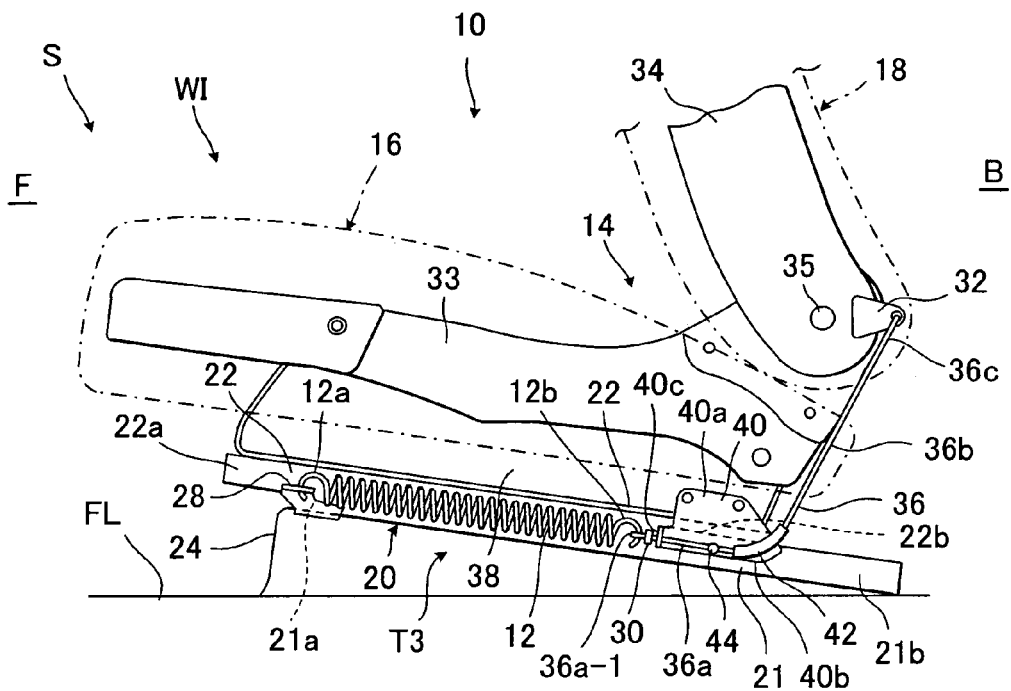
FIG. 3 is a partly broken side elevational view of the seat with walk-in mechanism, which shows the state where the seat is moved to a walk-in position.

Then, referring to FIG. 2, when it is desired to move the seat (S) to a walk-in position (See FIG. 3, as generally indicated by (WI)), a user has to first incline the seat back (18) forwardly as indicated by the arrow ①. Upon the seat back (18) being inclined forwardly as such, the wire cable (36) is drawn backwardly, which in turn stretches the extension coil spring (12). At this moment, though not shown, a lock mechanism in the seat slide device (20) is unlocked, thereby allowing the seat (S) to be movable forwardly along the seat slide device (20). Hence, when the seat back (18) is inclined forwardly by a predetermined angle until the forward stopper piece (30) is brought to contact with the support/stopper piece (40c), the extension coil spring (12) is resiliently stretched to a maximum degree, as indicated by (T2), whereupon that particular spring (12) is in a maximum active state where it creates a largest contractive force or a maximum tensile force therein, as a result of which, a great biasing force is generated in the spring (12) sufficient to bias the seat (S) in the forward direction, overcoming such resistant factors as a weight of the seat (S) and an increased friction due to the sloped support base (24), and therefore, as indicated by the arrow ②, a user can easily move the seat (S) forwardly toward the walk-in position (WI) along the sloped support base (24), using his or her small force, under the thus-created maximum biasing force of extension coil spring (12).

It is noted that a spring constant of the extension coil spring (12) is properly preset to provide the above-mentioned maximum tensile force required to sufficiently bias the seat (S) toward the walk-in position.

Figure 4:
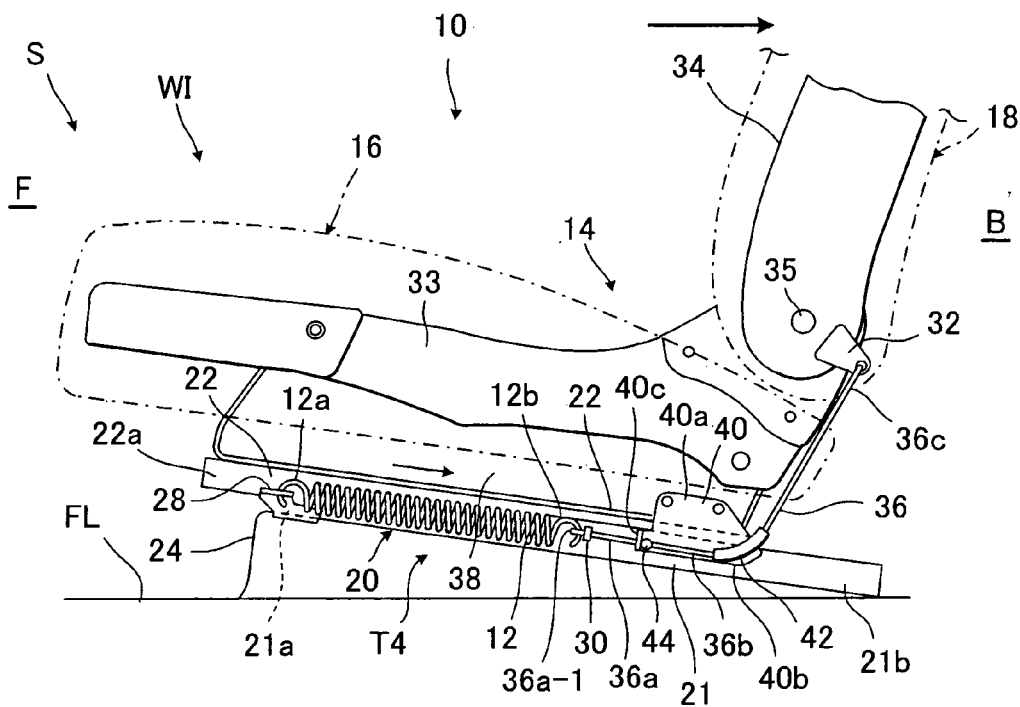
FIG. 4 is a partly broken side elevational view of the seat with walk-in mechanism, which shows the state where the seat back is returned to a normal upright position and a tensile force of the extension coil spring is decreased to a minimum degree.

Thereafter, as shown in FIG. 3, the seat (S) has been moved to and stopped at the walk-in position indicated by (WI), which allows a passenger to smoothly get in a space behind the sea (S) such as a rearward cabin section of vehicle. At this point, as the seat back (18) is still inclined forwardly, under which state, the extension coil spring (12) is resiliently contracted to such a degree as indicated by (T3), with a certain resilient contractive force remained therein. Then, upon the user releasing the seat back (18), under such still active tensile force of the spring (12), the seat back (18) is automatically rotated about the shaft (35) in backward direction and returned to the normal upright position as shown in FIG. 4. It is seen that the backward stopper piece (44) is brought to contact with the support/stopper lug (40c), so that the extension coil spring (12) is contracted to and retained at a point where the whole length thereof is shortened to a minimum degree, as indicated by (T4), which means that the tensile force of extension coil spring (12) is correspondingly reduced to a minimum degree. Advantageously, the thus-retained minimum tensile force not only insures to maintain a certain tension in the extension coil spring (12) itself, irrespective of the wire cable (36) connected with that spring (12) becoming loosened or slack due to a backward inclination of the seat back (18), but also allows a user to easily move back the seat (S), with his or her relatively small force required to overcome the minimum biasing force of extension coil spring (12), in a direction from the walk-in position show in FIG. 4 to the normal use position shown in FIG. 1, as indicated by arrows in the FIG. 4. Further, in that case, such certain tension maintained in the extension coil spring (12) advantageously serves to prevent disengagement of both forward and backward hooked engagement ends (12a) (12b) of that particular spring (12) from the respective forward stationary support member (28) and foremost engagement end (36a-1) of wire cable (36).

Accordingly, in accordance with the present invention, by simply engaging one end of the extension coil spring (12) with the movable support means (at 20, 40 and 36), an optimum tensile force is attainable in the extension coil spring (12), sufficient to realize the above-described various features; namely, (i) the seat (S) is biased to the walk-in position, thereby allowing a user to easily move the seat (S) along the sloped support base (24) to the walk-in position, with his or her small force, (ii) at such walk-in position, the extension coil spring (12) is contracted to a minimum degree, thus decreasing the tensile force thereof, which allows the user to easily overcome the tensile force of extension coil spring (12) and thus move back the seat (S), with his or her small force, to the normal use position from the walk-in position, and (iii) the extension coil spring (12) is kept in a tensed state, irrespective of the seat back (18) being inclined backwardly, to thereby prevent disengagement of that particular spring (12) from both of the forward stationary support member (28) and foremost engagement end (36a-1) of wire cable (36). Further, the structure of the seat (S) as well as of the walk-in mechanism (10) is much simplified, and there is no need to increase the size of the extension coil spring (12) for additionally increased its tensile force.

While having described the present invention thus far, it should be understood that the invention is not limited to the illustrated embodiment, but modification, replacement and addition may be applied thereto without departing from the scope of the appended claims.

What is claimed is:

1. A structure of seat with walk-in mechanism in combination with a floor of vehicle,
wherein said seat is movable in a forward direction to slide forwardly thereof and in a backward direction to slide backwardly thereof, said seat including: a seat cushion; and a seat back rotatably connected with said seat cushion so as to allow for forward inclination thereof in said forward and backward inclination thereof is said backward directions, wherein said walk-in mechanism includes a spring means and is operable in conjunction with said forward inclination and backward inclination of said seat back, such that, with the forward inclination of the seat back, said seat is biasingly caused by said spring means to move from a normal use position in said forward direction to a walk-in position which allows a passenger to enter a space behind said seat, wherein said walk-in mechanism comprises;
an extension coil spring element as said spring means, said extension coil spring having one end and another end;
a first support means fixed to said floor of vehicle so as to be stationary relative to said floor of vehicle;
said one end of said extension coil spring being engaged with said first support means; and
a second support means fixedly provided to said seat, such that, with movement of said seat in said forward and backward directions, said second support means is moved relative to said floor of vehicle in said forward and backward directions, said second support means including a connecting means for operatively connecting said another end of said extension coil spring with said seat back,
and
wherein movement of said seat in said forward and backward directions causes simultaneous movement of both said second support means and said another end of said extension coil in the forward and backward directions, and wherein, upon said seat back being inclined in said forward direction, said another end of said extension coil spring is moved in the backward direction via said connecting means.

2. The structure of seat with walk-in mechanism as claimed in claim 1, wherein said connecting means comprises: a wire cable having one end portion and another end portion; and a link element which is fixed to said seat back so as to be displaceable with the forward and backward inclination of the seat back, and wherein said one end portion of said wire cable is engaged with said another end of said extension coil spring, while said another end portion of said wire cable is connected with said link element, such that said one end portion of said wire cable is movable in said forward and backward directions in conjunction with said forward and backward inclination of said seat back, to thereby increase and decrease a tensile force of said extension coil spring extended between said first support member and said one end portion of said wire cable.

3. The structure of seat with walk-in mechanism according to claim 2, wherein a stopper means is provided, which provides a limit point and prevents said one end portion of said wire cable from being moved in excess of said limit point in said forward direction, so as to set said extension coil spring in a minimum active point where a tensile force of the extension coil spring is decreased to a minimum degree.

4. The structure of seat with walk-in mechanism as claimed in claim 1, wherein said seat cushion is connected via a sloped support base with said floor of vehicle, such that said seat is movable along a sloped line in said forward and backward directions.

* * * * *